Patented Sept. 19, 1922.

1,429,498

UNITED STATES PATENT OFFICE.

ERNEST B. FOLSOM, OF SAN FRANCISCO, CALIFORNIA, ASSIGNOR TO PACIFIC MILL & MINE SUPPLY COMPANY, OF SAN FRANCISCO, CALIFORNIA, A CORPORATION OF CALIFORNIA.

BELT DRESSING.

No Drawing.   Application filed April 30, 1919. Serial No. 293,724.

*To all whom it may concern:*

Be it known that I, ERNEST B. FOLSOM, a citizen of the United States, residing at the city and county of San Francisco, and State of California, have invented new and useful Improvements in Belt Dressings, of which the following is a specification.

This invention relates particularly to a composition of matter, and particularly pertains to a belt dressing and a method of making the same.

It is the principal object of the present invention to provide a belt dressing especially adapted for use with rubber belts which will supply the belt with a suitable coating to provide the proper traction, and which will also insure that the pulley wheels will not act to pull the covers off of these rubber belts.

The present invention contemplates the use of a composition of wool grease and rubber in solution, which rubber will act with the rubber coating of the belting to produce a very desirable result.

A preferred form of the present invention constitutes a composition of wool grease, rubber solution, caustic soda, rosin and oil of citronella. The wool grease is provided to give body to the belt covering and also insures that the hard rubber surface of the belt will be materially softened. About 96% of this material is used in the solution. The rubber used in the present solution is provided to give friction to the belt face and also to return a sufficient amount of rubber to the surface of the belt to fill up all the cracks and make the belt surface as it originally was. This will insure that the surface of the belt will be maintained in its natural condition at all times and will be constantly replenished by the operation of the belt dressing and the continuous deposit of the rubber solution thereof.

Caustic soda is provided to saponify the mixture. This soda also acts to harden the rubber and gives the composition considerable body. The amount of rosin included in the composition is provided to give hardness and body, while the citronella is merely to remove the objectional odors of the wool grease.

In producing the composition of matter with which the present invention is concerned, the rubber is prepared in a vat and is cut with fish oil or with gasoline and a methyl alcohol. In either instance the rubber is placed in a vat and thereafter heated until the rubber is thoroughly dissolved. The wool grease is then heated to about 350° Fahrenheit, and, after it has been thoroughly melted, rosin is separately added. This rosin has been previously heated to a temperature of probably 450° Fahrenheit in order to make it of proper consistency to blend with the wool grease.

After the wool grease and the rosin have been blended together, they are boiled for about a half hour, and when this boiling action has been completed the caustic soda is slowly added and it will take about ten minutes for it to work into the mass. The mixture is then boiled for about two hours and a half and is permitted to thereafter cool to approximately 280°. When the mixture has cooled to this temperature the rubber in solution is added, after it has been formed in the manner previously indicated. The mass is then allowed to completely cool and may be placed in any sort of containers to be afterwards packed.

The belt dressing may be applied as desired to the belt and as required by any suitable means.

In carrying out the present invention it is preferable to use the following proportions:

| | |
|---|---|
| Wool grease | 96 lbs. |
| Rubber solution | 14 " |
| Caustic soda | 6 " |
| Rosin | 8 " |
| Citronella | ½ pint. |

Having thus described my invention, what I claim and desire to secure by Letters Patent is—

1. A composition of matter comprising wool grease and a proportion of rubber in solution in a solvent.

2. A belt dressing made from a gasoline and methyl alcohol solvent, wool grease and rubber.

3. A belt dressing made from a greasy base, rubber mixed therewith and rosin added thereto to give body and hardness to the composition.

4. A belt dressing made from wool grease, rubber, a solvent therefor, caustic soda and resin.

5. A method of producing a belt dressing which consists in melting wool grease and rosin and thereafter mixing and boiling the melted ingredients together, after which caustic soda is slowly added and worked into the mass, the mixture then being boiled, and thereafter cooled to a temperature of approximately 280°, at which time rubber in solution is added and the entire mass permitted to completely cool and solidify.

In testimony whereof I have hereunto set my hand in the presence of two subscribing witnesses.

ERNEST B. FOLSOM.

Witnesses:
M. C. FORD,
D. B. RICHARDS.